(12) United States Patent
Van Ee

(10) Patent No.: US 11,613,886 B2
(45) Date of Patent: Mar. 28, 2023

(54) PIXEL BLOCK

(71) Applicant: Jonathan Hendrik Van Ee, Dublin, CA (US)

(72) Inventor: Jonathan Hendrik Van Ee, Dublin, CA (US)

(*) Notice: Subject to any disclaimer, the term of this patent is extended or adjusted under 35 U.S.C. 154(b) by 0 days.

(21) Appl. No.: 17/305,448

(22) Filed: Jul. 7, 2021

(65) Prior Publication Data

US 2022/0042299 A1     Feb. 10, 2022

Related U.S. Application Data

(60) Provisional application No. 62/706,229, filed on Aug. 6, 2020.

(51) Int. Cl.
    *E04B 1/343*          (2006.01)

(52) U.S. Cl.
    CPC .................................. *E04B 1/34331* (2013.01)

(58) Field of Classification Search
    CPC .... A63H 33/062; A63H 33/086; A63H 33/08; A63H 33/04; A63H 33/088; A63H 33/067; E04B 1/34331
    See application file for complete search history.

(56) References Cited

U.S. PATENT DOCUMENTS

| | | | | |
|---|---|---|---|---|
| 5,000,713 | A * | 3/1991 | Cheng | A63H 33/06 446/128 |
| 8,403,723 | B1 * | 3/2013 | Haner | A63B 67/007 446/124 |
| 8,568,187 | B2 * | 10/2013 | Norman | A63H 33/084 446/124 |
| D762,267 | S * | 7/2016 | Glasband | D21/484 |
| 9,839,860 | B2 * | 12/2017 | Rakhsha | A63H 33/04 |
| D912,163 | S * | 3/2021 | De Wilde | D21/484 |
| D937,937 | S * | 12/2021 | Nevgi | A63H 33/062 D21/499 |
| 2015/0251104 | A1 * | 9/2015 | Lange | A63H 33/042 446/92 |
| 2016/0346708 | A1 * | 12/2016 | Yim | A63H 33/088 |
| 2019/0022544 | A1 * | 1/2019 | Luo | A63H 33/08 |
| 2022/0023767 | A1 * | 1/2022 | Gaba | A63H 33/042 |

\* cited by examiner

*Primary Examiner* — Brian E Glessner
*Assistant Examiner* — Daniel J Kenny

(57) ABSTRACT

The Pixel Block builds a wide range of useful constructions such as tables, chairs, and houses, with the modularity in three-dimensional space to make a universe of objects with a versatility similar to that of a pixel on a computer screen. It has a basic cylindrical shape that is as long as it is wide and deep to occupy a basic cube space. It is a versatile and useful geometric building block comprised of snaps, screws, nobs, magnetic forces, and combinations of these interfaces to assemble into constructions comprised of multiple copies of the Invention. On one end of the cylinder is a protruding screw that is also a hook and a snap, that can fit into itself and into each of five other sides of the cylinder. Once assembled into a shape, the Invention can be locked in place with spheres or with cylinders inside the Invention.

1 Claim, 19 Drawing Sheets

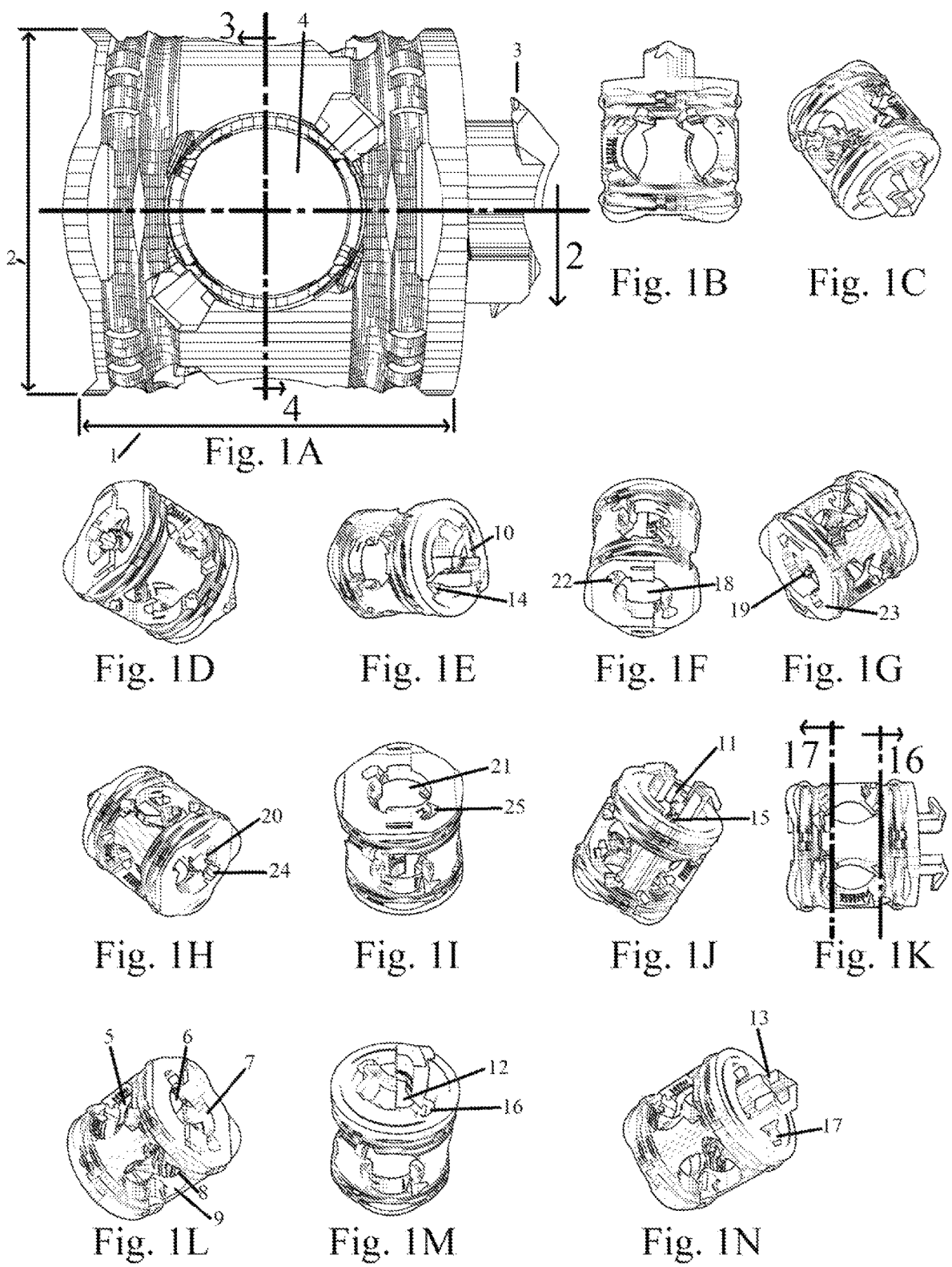

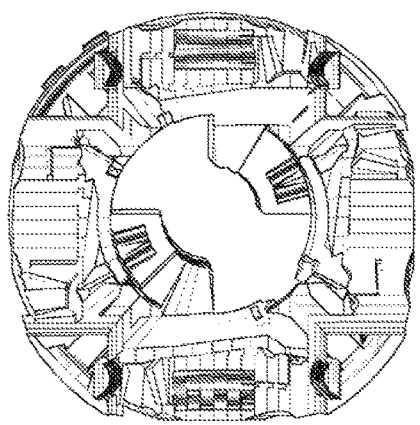
Fig. 4F
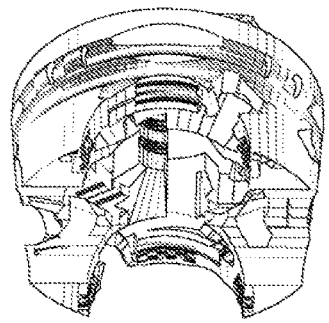
Fig. 4G
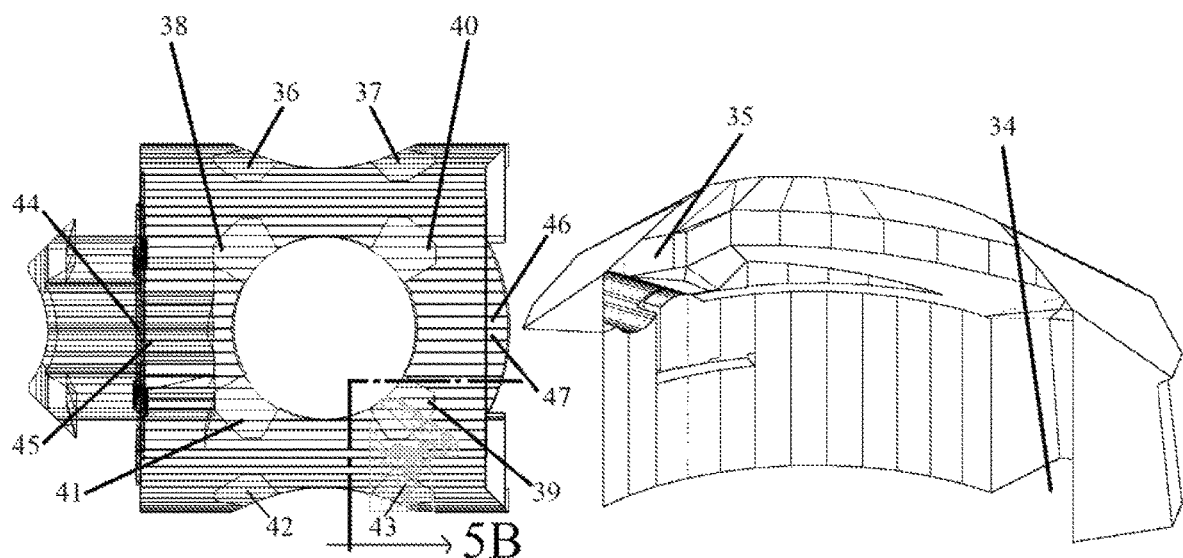
Fig. 5A
Fig. 5B

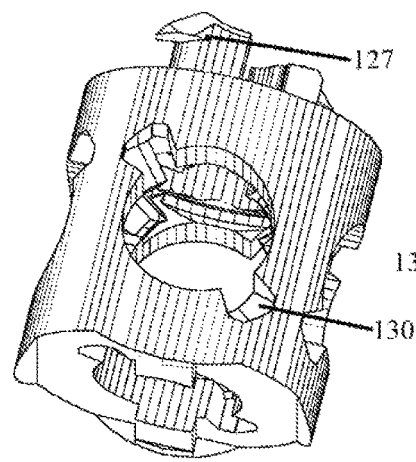
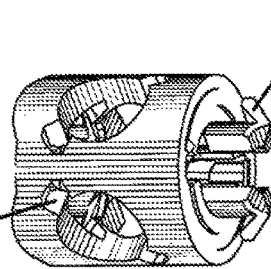
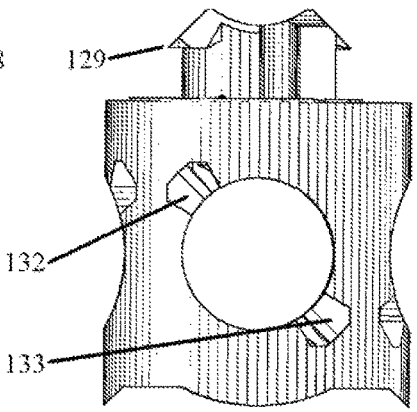
Fig. 25A  Fig. 25B  Fig. 25C
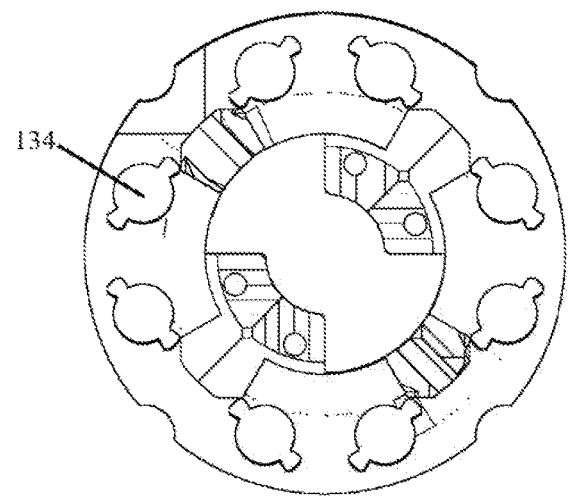
Fig. 26A
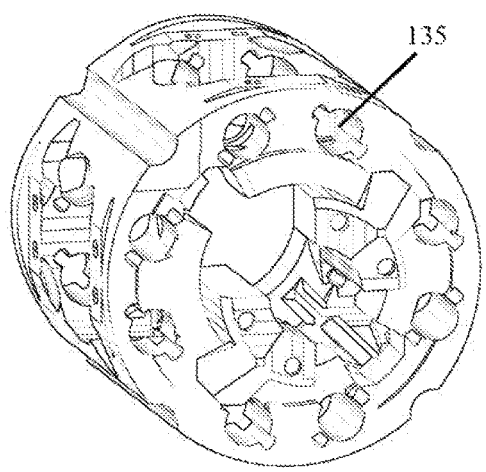
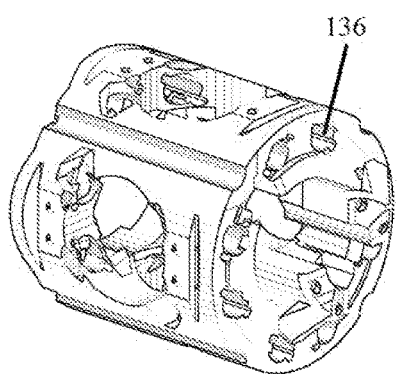
Fig. 26B  Fig. 26C

PIXEL BLOCK

BACKGROUND OF THE INVENTION

Field of the Invention

The Pixel Block (the "Invention") is a versatile and useful geometric shape comprised of snaps, screws, nobs, magnetic forces, and combinations of these interfaces to be an object that builds a wide range of useful constructions such as tables, chairs, walls, bridges, shelves, houses and additional useful objects with the modularity in three-dimensional space to make a universe of objects with a versatility similar to that of a pixel on a screen that describes the world in two dimensional space.

Description of Related Art

Modular building blocks.

Screws, knobs and snaps that are part of other objects like clothing, shafts and bricks.

BRIEF SUMMARY OF THE INVENTION

The invention has a basic cylindrical shape that is as long as it is wide and deep to occupy a basic cube space. On one end of the cylinder is a protruding screw that is also a hook and a snap, that can fit into itself and into each of the other five sides of the cylinder that correspond to each of the five sides of a cube space that the cylinder occupies. In this manner multiple copies of the Invention can be assembled together to build constructions that extend into each of the three dimensions.

The Invention's versatile design allows it to be built with flexible objects like rubber and flexible plastics, and it can be built with rigid objects like glass, ceramics and cast iron. Once assembled into a shape, the Invention can be locked in place with spheres or with cylinders inside the Invention. In addition to interfacing with additional copies of the Invention that are the same size as the Invention, the Invention can interface with pieces of its own geometry that are twice the size of the Invention, half the size, and a quarter of its size.

Because the Invention builds structures with interior shafts that can lock the structures or that can reinforce them, those shafts can also be conduits of smaller pieces of the Invention. In addition to having shafts inside the structures it builds, the Invention can build larger shafts with the outer surfaces of structures built by the Invention. In other words, in addition to building chairs, tables and other useful objects, the Invention can build shafts. All these shafts can be conduits for spheres that carry objects with the geometry of the Invention inside them. By being able to carry Invention objects inside the constructions, and outside shaft constructions, the Invention can build out structures. In other words, the Invention operates as a scaffolding that can be used to build out the structures it builds. The Invention does not necessarily require additional outside support to build things.

BRIEF DESCRIPTION OF THE SEVERAL VIEWS OF THE DRAWINGS

FIG. 1A is a horizontal profile view from the side of the Invention.

FIG. 1B is a vertical profile view of FIG. 1A from a different angle.

FIG. 1C is a view at an angle of FIG. 1A.

FIG. 1D is a view from a bottom corner of FIG. 1A.

FIG. 1E is a view from a front corner of FIG. 1A.

FIG. 1F is a view from a bottom edge of FIG. 1A.

FIG. 1G is a view from a back corner of FIG. 1A from a different angle.

FIG. 1H is a view from a back corner of FIG. 1A from another angle.

FIG. 1I is a view from a bottom side of FIG. 1A.

FIG. 1J is a view from a front side of the invention.

FIG. 1K is a horizontal profile view of FIG. 1A when it is rotated.

FIG. 1L is a bottom side view of FIG. 1A.

FIG. 1M is a front side view of FIG. 1A.

FIG. 1N is a front corner view of FIG. 1A.

FIG. 4F is a close up view of the top of FIG. 1A from the inside with the back side cut off.

FIG. 4G is another closer-up view of the front of FIG. 1A with the back cut off.

FIG. 5A is a wireframe view of a simplified version of the Invention for clarity.

FIG. 5B is a solid view of that same area from a different vantage point for clarity.

Figure 8:
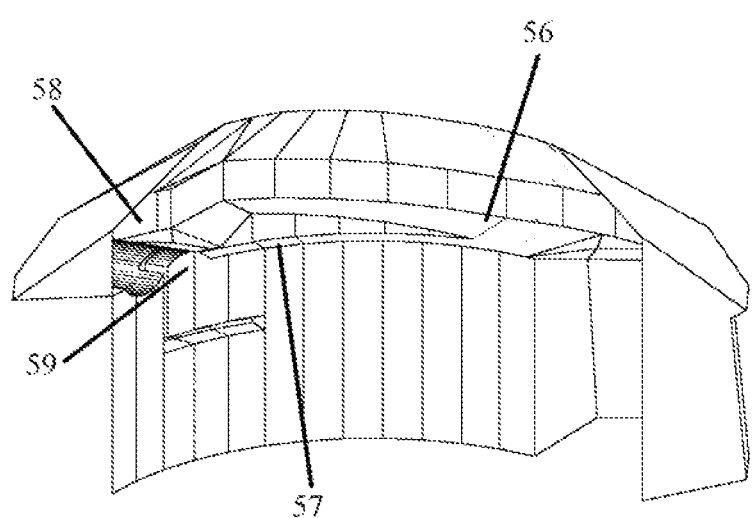
FIG. 8 is a view of a flexible materials Invention with a focus on the female hook enclosure side where the hook locks in place.
Figure 10:
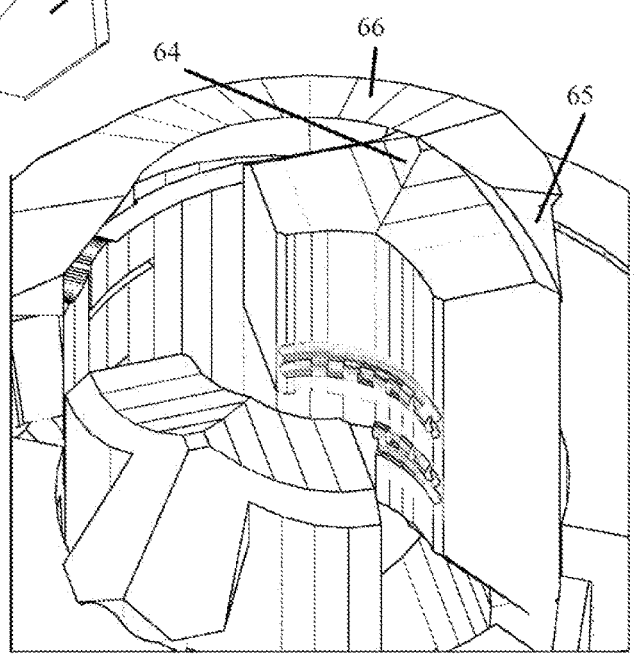
FIG. 10 shows how the Invention's hook is inserted into the shaft at the right side of FIG.

The simple view of FIG. 8 is substantially (though not exactly) reproduced in FIG. 10 to show how the Invention gets inserted.

Figure 11:
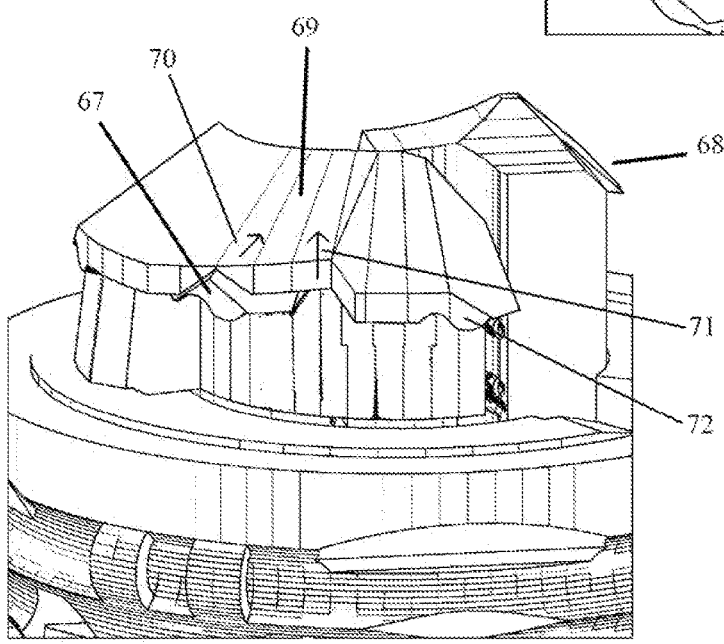

FIG. 11 shows how the invention's hooks interface with the enclosure that is represented by FIG. 8.

Figure 12:
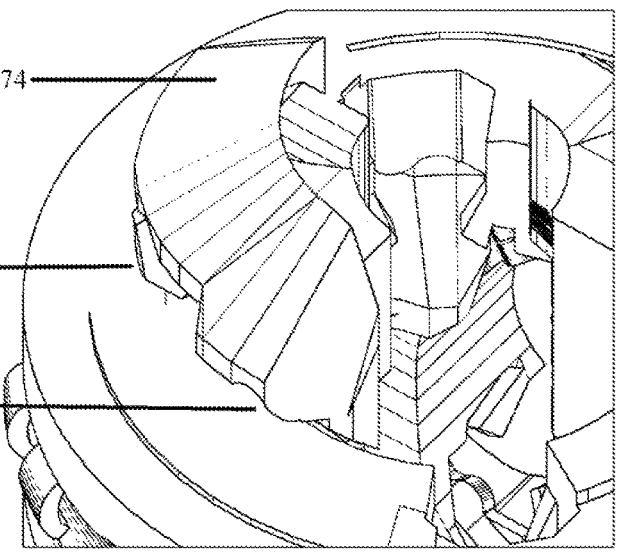

FIG. 12 is a different view of the same arrangement shown in FIG. 11.

Figure 13:
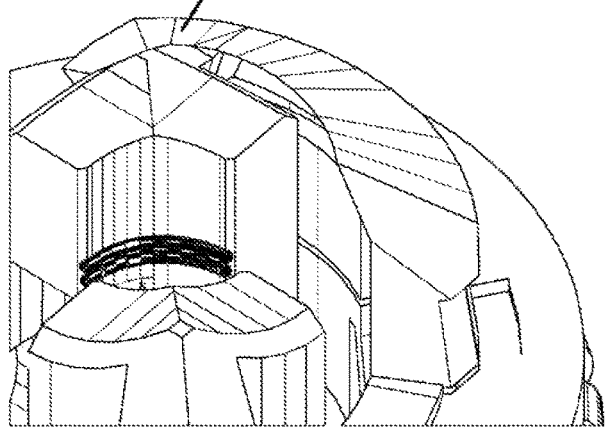

FIG. 13 shows the Invention fully rotated into the hook enclosure to the point where the hook snaps out to be securely held in that position.

Figure 14:
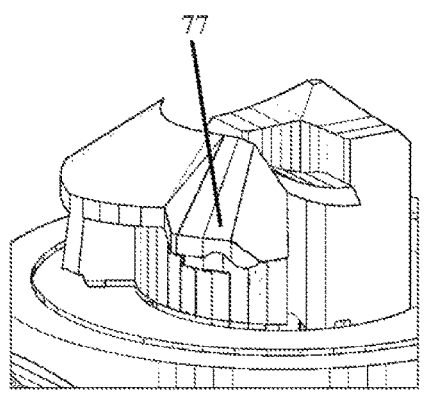

FIG. 14 is a different view of the snapped-in hook shown in FIG. 13.

Figure 15A:
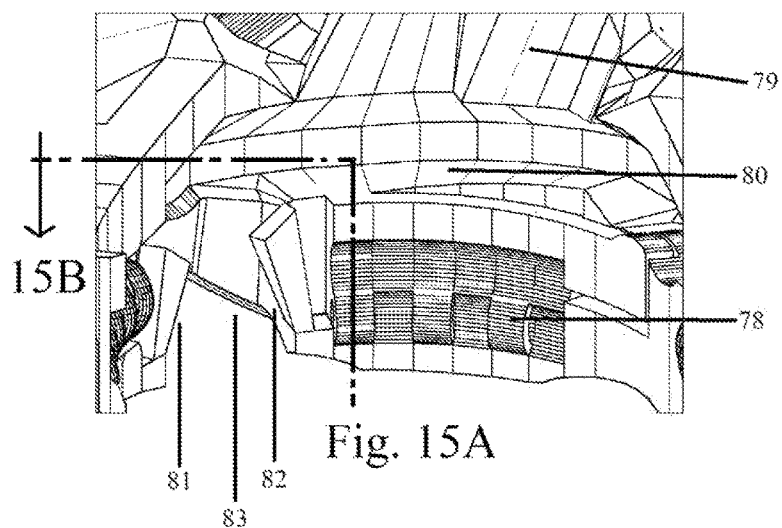

FIG. 15A is a close-up view of the inner cylinders in FIG. 1A.

Figure 15B:
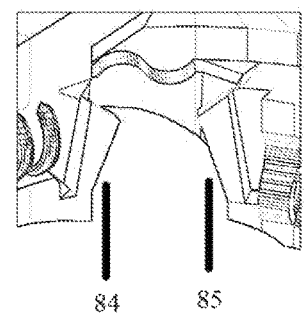

FIG. 15B at elements 20 and 21 is a different view of the flexible sticks discussed in relation to FIG. 15A.

Figure 15C:
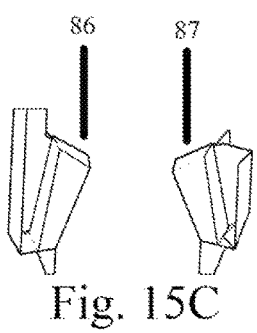

FIG. 15C is a cut-out view of the hooks and snaps discussed in relation to element 22 and element 23.

Figure 16:
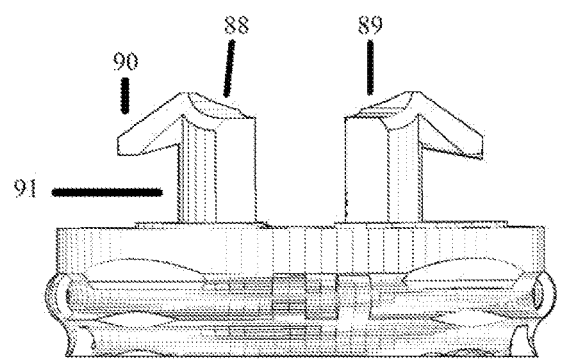

FIG. 16 is a profile view of the hooks that demonstrates the two directions the Invention's hooks move when they are inserted into the hook enclosure and rotated.

Figure 17:
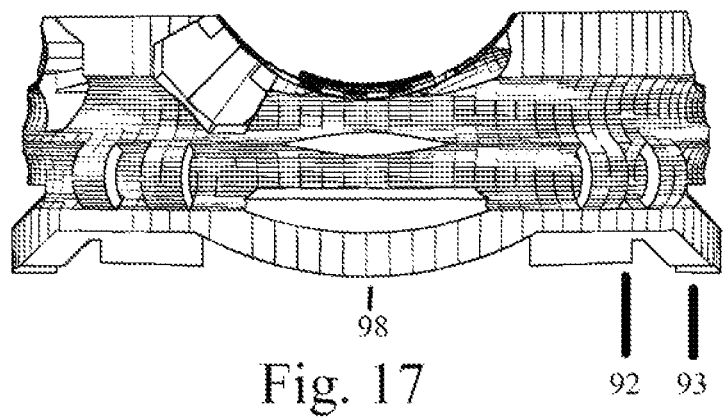
Figure 18:
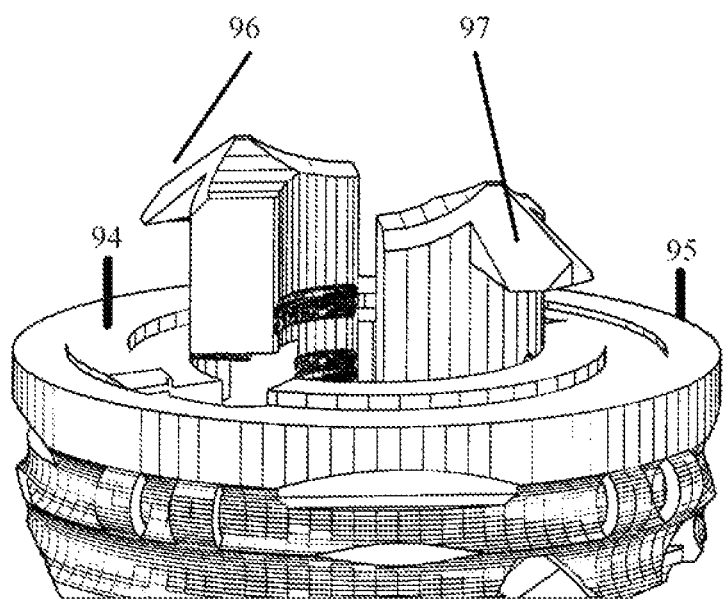

FIG. 17 at element 26 shows where the bottom of the Invention interfaces with the raised part of the top part of the Invention at element 28 in FIG. 18. The bottom part of the Invention at FIG. 17 element 27 rests on the top part of the Invention at element 29 on FIG. 18 when the hooks on the top of the Invention are inserted into the bottom part of another Invention piece.

FIG. 18 is a close-up view of FIG. 1A that shows the location of element 28 and element 29.

Figure 19A:
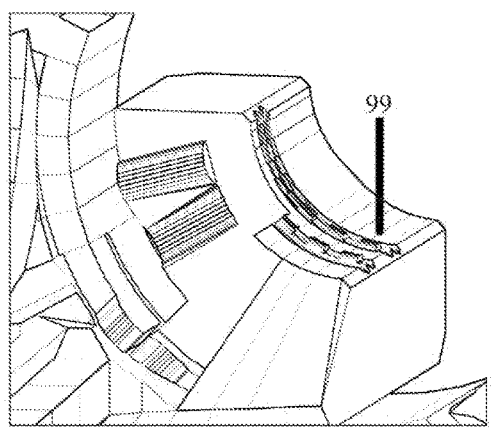

FIG. 19A is a close-up view from the inside of the shaft at the front of FIG. 1A.

Figure 19B:
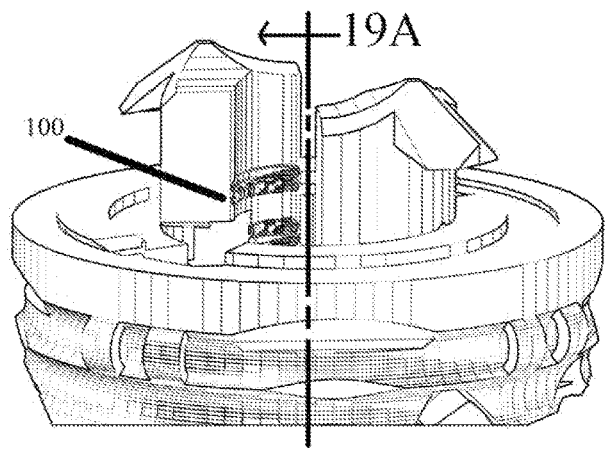

FIG. 19B is a close-up view of the front of FIG. 1A to show the location of element 31.

Figure 2A:
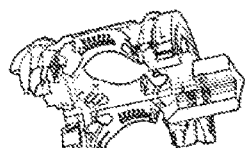
FIG. 2A is a half cut off view of the front bottom FIG. 1A with the bottom half cut off.
Figure 2B:
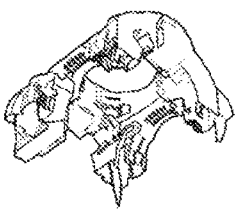
FIG. 2B is a cut off view from the bottom of FIG. 1A with the bottom cut off.
Figure 2C:
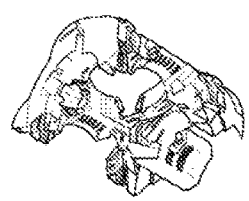
FIG. 2C is another view from the back bottom of FIG. 1A with the bottom half cut off.
Figure 2D:
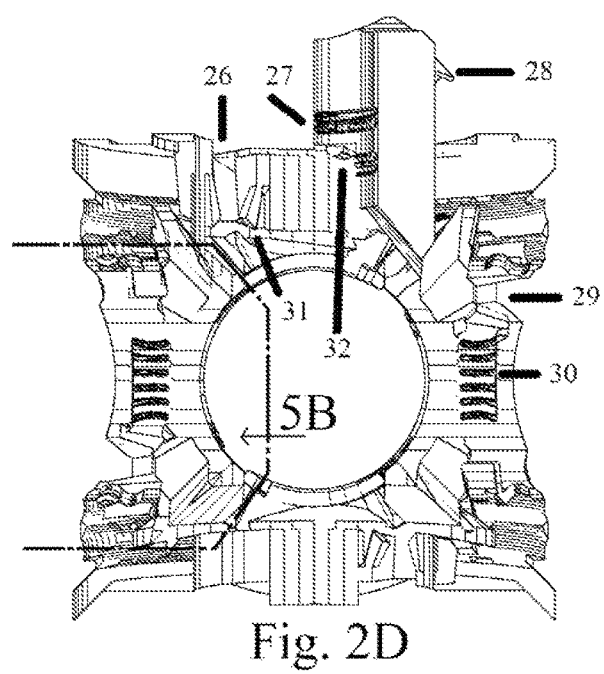
FIG. 2D is a view of the Invention with one half of the Invention cut off for clarity.

FIG. 19A at element 30 and FIG. 19B at element 31 are different views of the "s" snap that is also shown at FIG. 2D element 2 and that is discussed above.

Figure 20A:
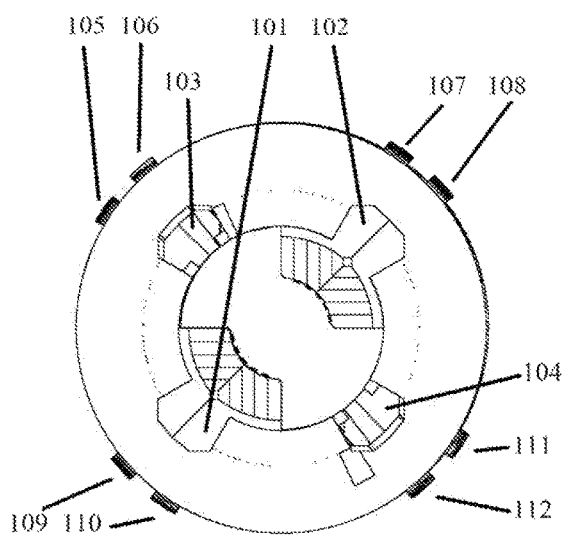

FIG. 20A is a profile view of the Invention from the top showing the hooks and the hook shafts on the top of the invention.

Figure 20B:
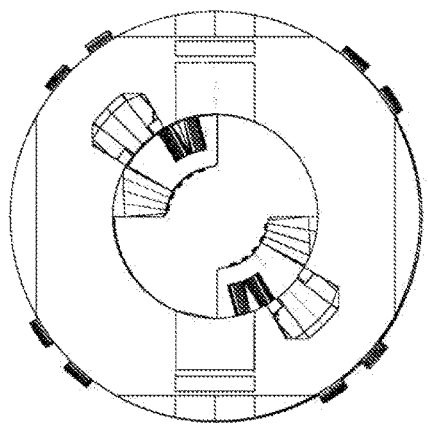

FIG. 20B is a profile view of the bottom of the Invention looking up to where the hooks are on the top of the Invention.

Figure 21:
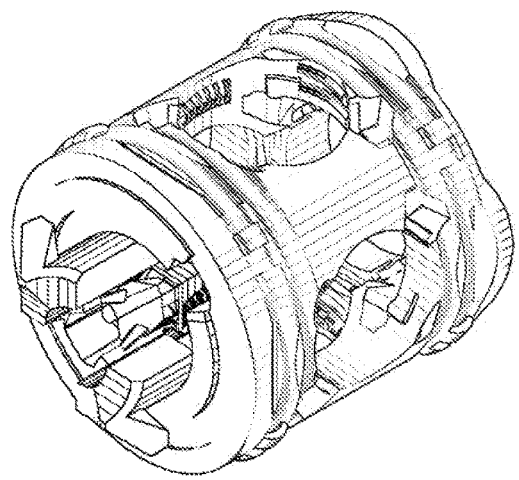

FIG. 21 is a different view of the Invention for clarity.

Figure 22:
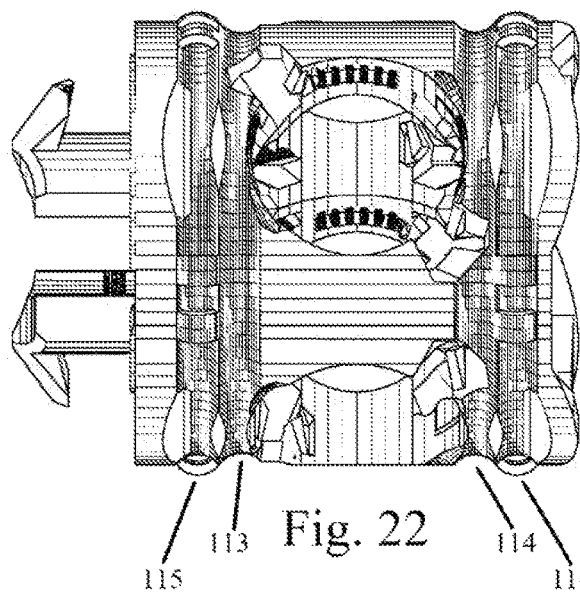

FIG. 22 is a different view of the Invention for clarity.

Figure 23A:
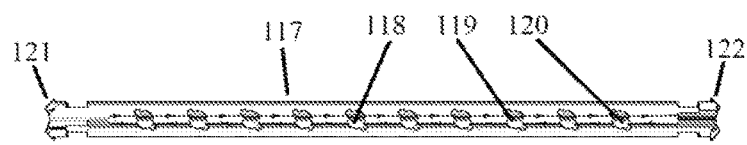

FIG. 23A is the Invention in a pole format that allows it to more easily pull together larger constructions.

Figure 23B:
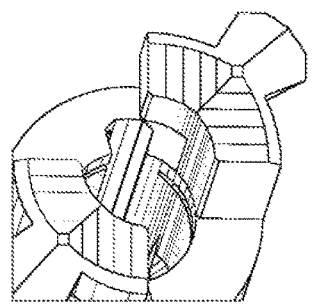

FIG. 23B is a close-up view of an end of FIG. 23A.

Figure 23C:
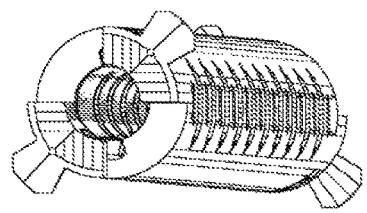

FIG. 23C is a view from a front side of FIG. 23A.

Figure 24A:
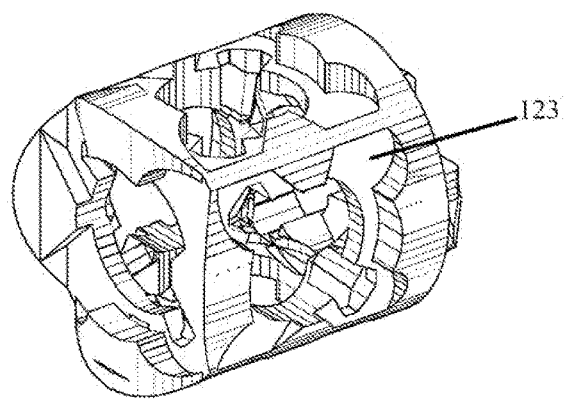

FIG. 24A is the Invention in a format that allows the insertion of circular magnets.

Figure 24B:
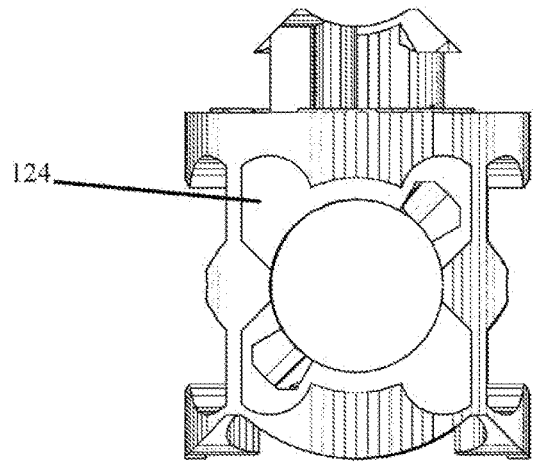

FIG. 24B is a profile view from a side of FIG. 24A when it stands upright.

Figure 24C:
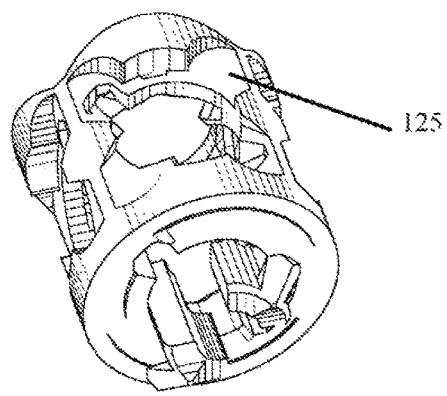

FIG. 24C is a view of FIG. 24A from a back side.

Figure 24D:
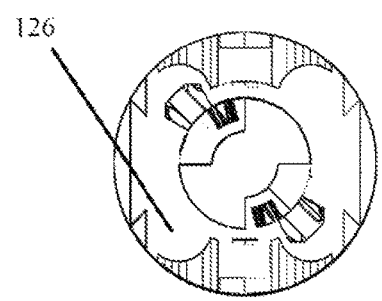

FIG. 24D is a profile view from the back of FIG. 24A.

FIG. 25A is a simplified view of the Invention to show how its hooks work.

FIG. 25B is a view from the front side of FIG. 25A.

FIG. 25C is a profile view from a side of FIG. 25A.

FIG. 26A is a profile view from the front of FIG. 26B.

FIG. 26B is a version of the Invention that allows for poles in the shape of the Invention to be inserted through it.

FIG. 26C is a view from a front side of FIG. 26B from a slightly different angle.

Figure 27A:
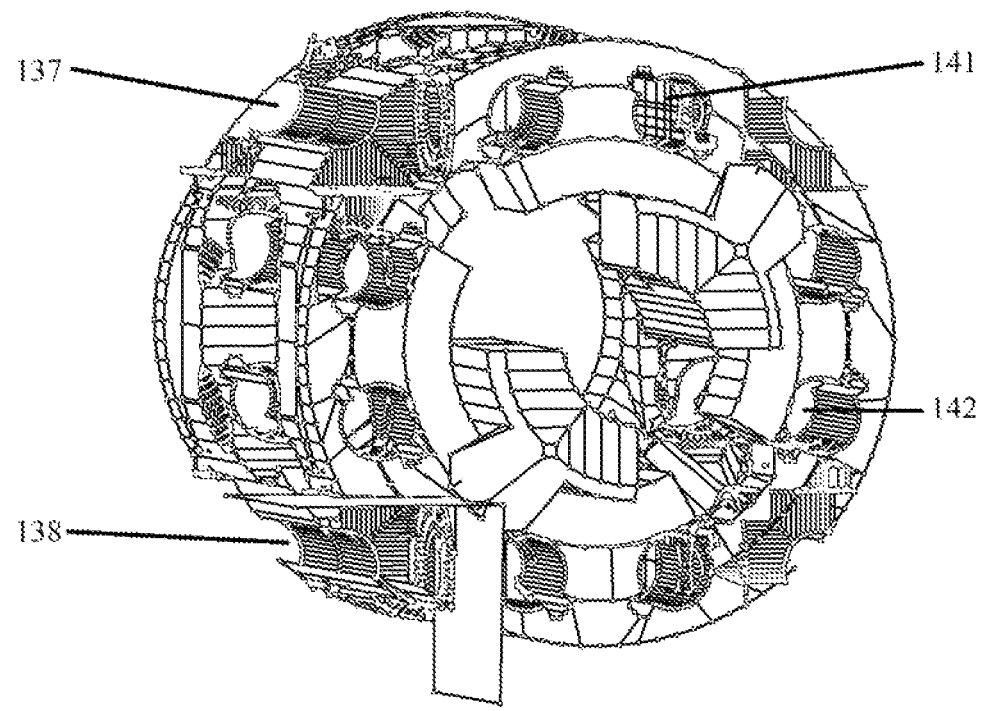

FIG. 27A shows the Invention in a configuration where cubes can be inserted on its corners, in addition to having poles traverse the invention.

Figure 27B:
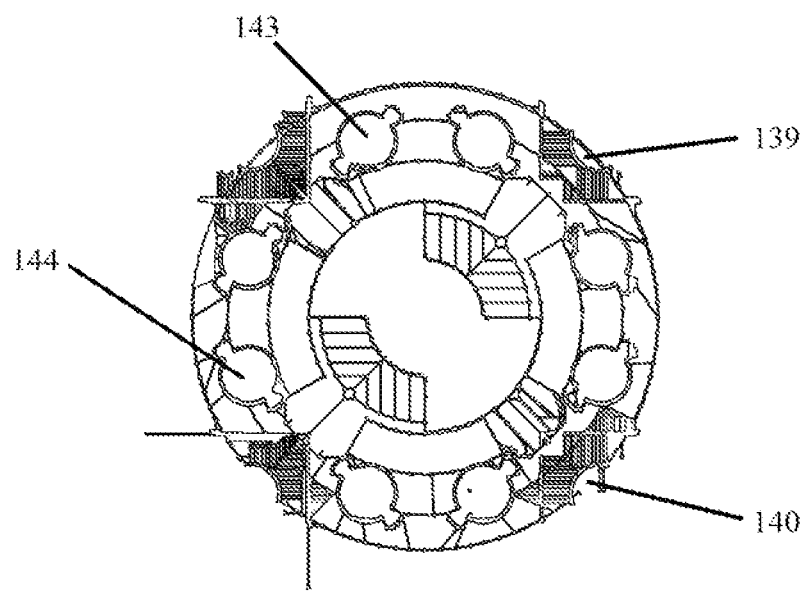

FIG. 27B is a profile view of FIG. 27A from the front.

FIGS. 28 through 36 show how Inventions of the same size, and of different sizes, can be assembled into constructions to have a progressively larger construction.

Figure 28:
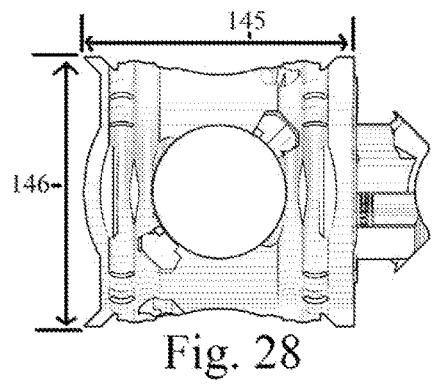

FIG. 28 is an embodiment of the Invention in a cylinder that occupies an equilateral cube space.

Figure 29:
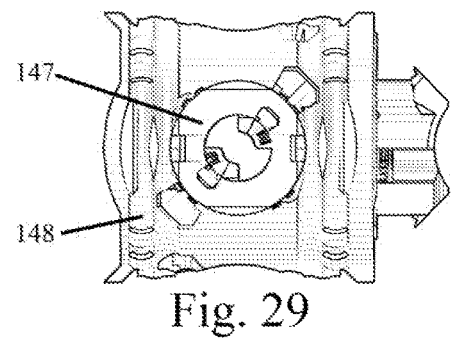

FIG. 29 shows how an Invention that is half the size of another Invention can be inserted into the invention.

Figure 30:
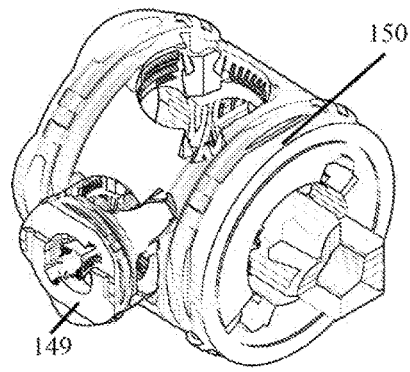

FIG. 30 is another view of FIG. 29.

Figure 31:
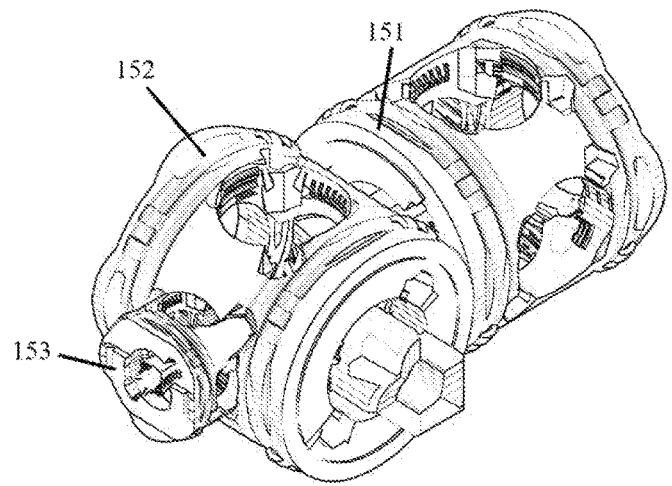

FIG. 31 shows how an Invention of the same size as another Invention can be inserted into a construction that already has an Invention that is half its size.

Figure 32:
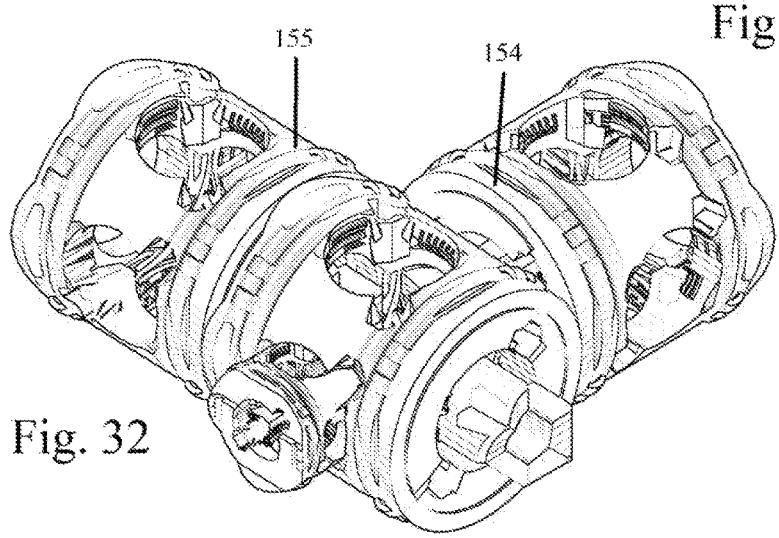

FIG. 32 shows how the construction that is FIG. 31 can have an additional Invention inserted to build out the construction more.

Figure 33A:
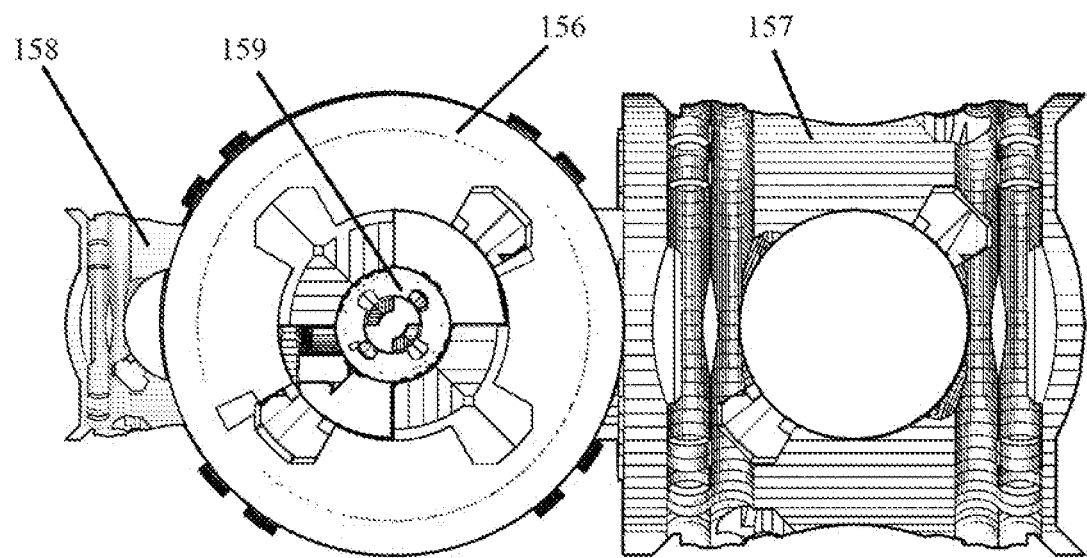

FIG. 33A shows Invention pieces assembled when they are of equal size, half the size of another piece (as in the piece to the left in FIG. 33A) and a piece that is one-fourth the size of the larger pieces (the piece inside the knob facing the viewer to the middle left of FIG. 33A).

Figure 33B:
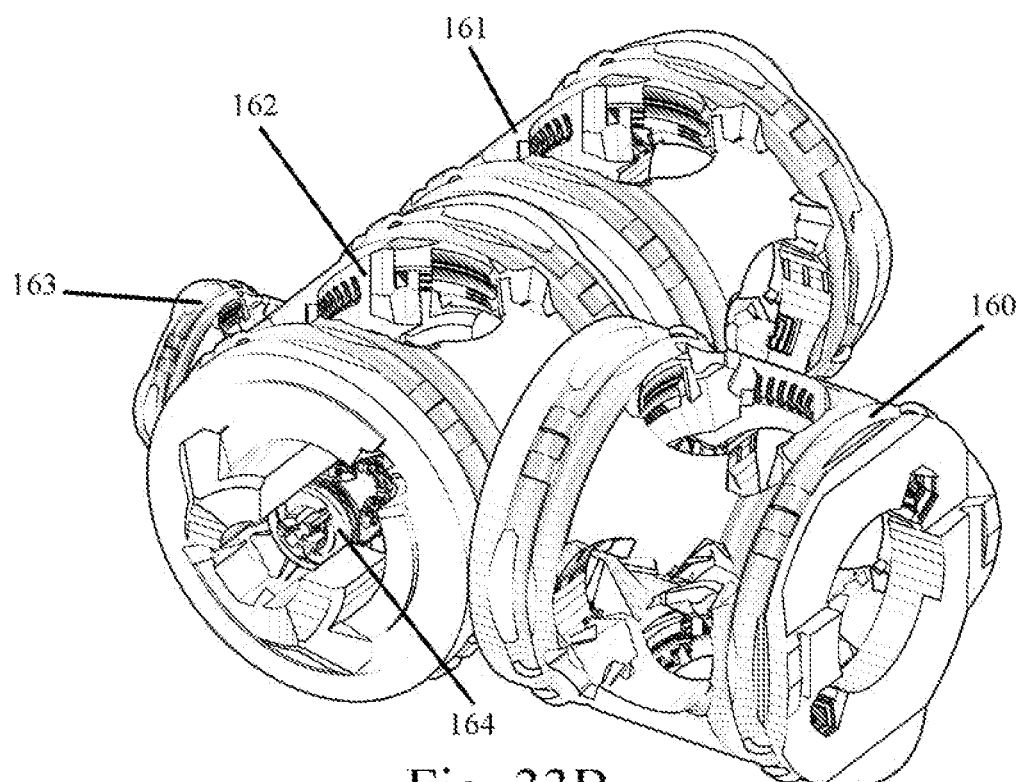

FIG. 33B is the construction at FIG. 33A but viewed from a different angle.

Figure 34A:
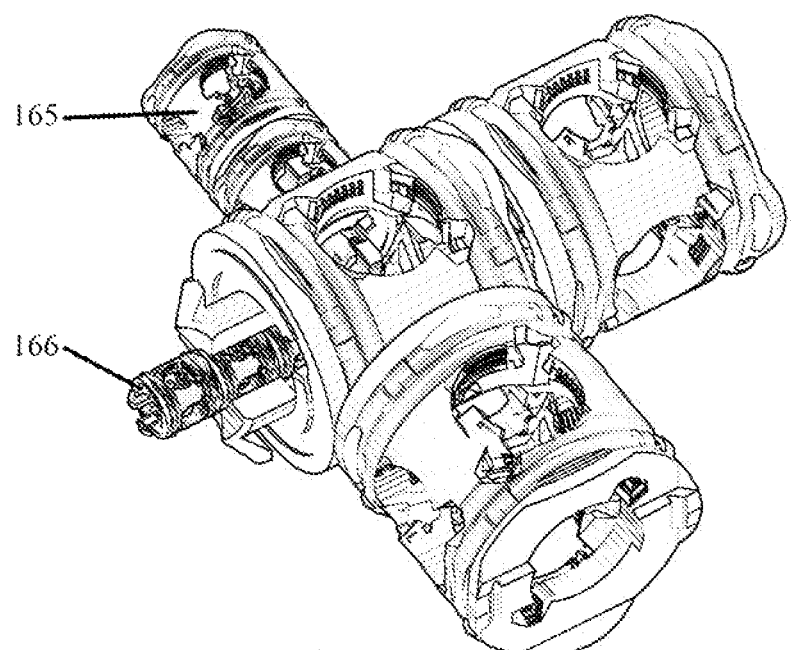

FIG. 34A is the same construction as FIG. 33A except that additional Invention pieces have been added at the top left and at the middle left (the piece added at the middle left is one fourth the size of the large pieces in FIG. 34A).

Figure 34B:
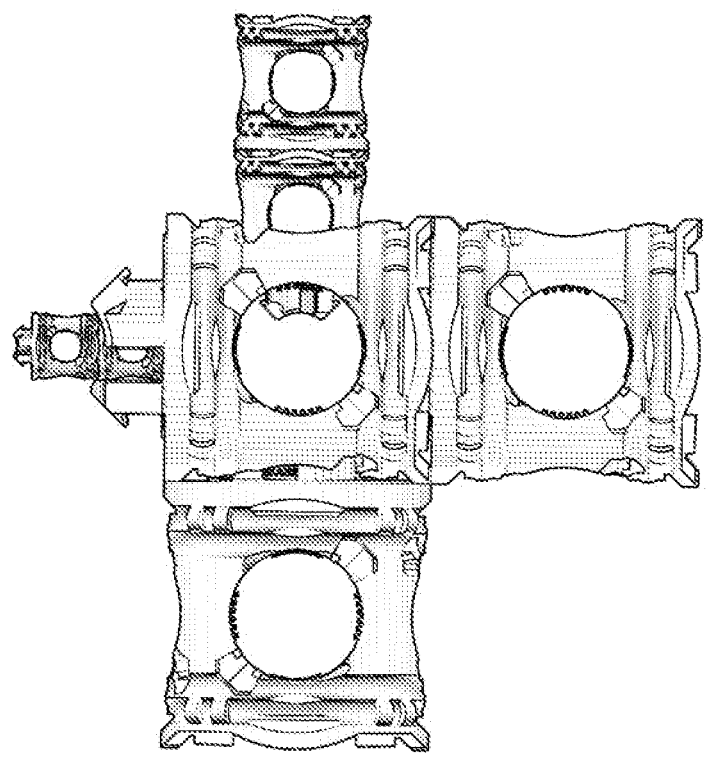

FIG. 34B is the same construction as FIG. 34A except from a profile view.

Figure 35:
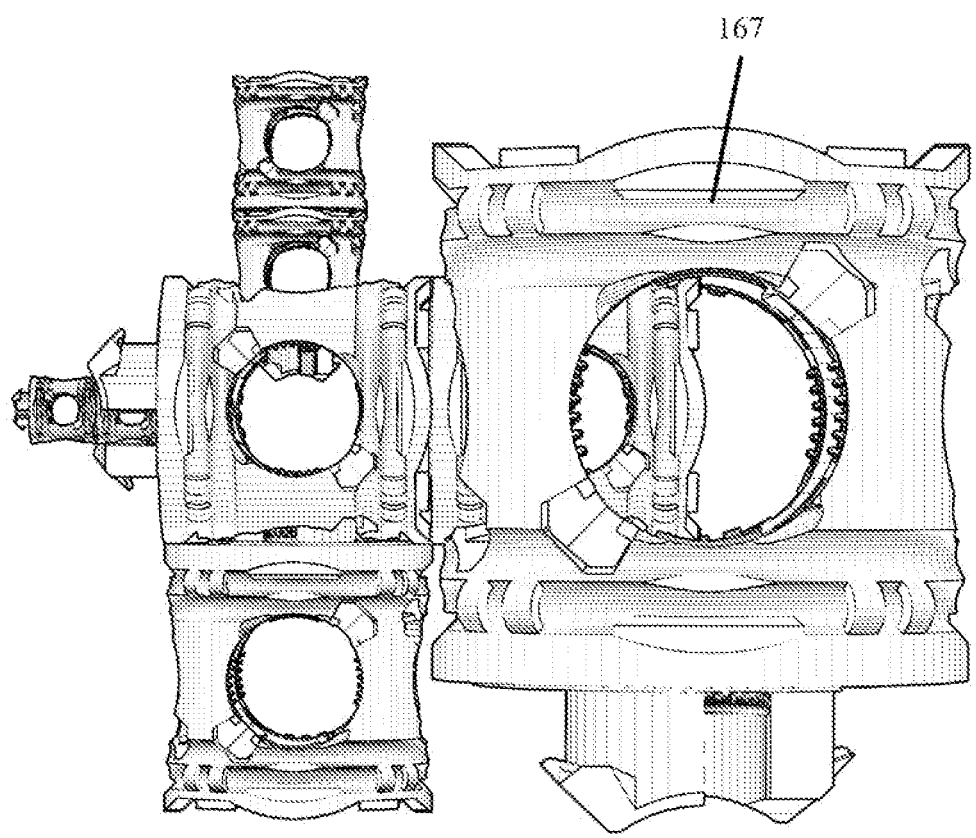

FIG. 35 is the same construction as FIG. 34A except on the right is also has a piece that is twice the size of the three other large pieces in the construction.

DETAILED DESCRIPTION OF THE INVENTION

FIG. 1A is a horizontal profile view from the side of the Invention.

FIG. 1B is a vertical profile view of FIG. 1A from a different angle.

FIG. 1C is a view at an angle of FIG. 1A.

FIG. 1D is a view from a bottom corner of FIG. 1A.

FIG. 1E is a view from a front corner of FIG. 1A.

FIG. 1F is a view from a bottom edge of FIG. 1A.

FIG. 1G is a view from a back corner of FIG. 1A from a different angle.

FIG. 1H is a view from a back corner of FIG. 1A from another angle.

FIG. 1I is a view from a bottom side of FIG. 1A.

FIG. 1J is a view from a front side of the invention.

FIG. 1K is a horizontal profile view of FIG. 1A when it is rotated.

FIG. 1L is a bottom side view of FIG. 1A.

FIG. 1M is a front side view of FIG. 1A.

FIG. 1N is a front corner view of FIG. 1A.

The Invention does not have a single absolute size. Instead, the ratio of the size of the Invention's features relative to other features is important. For example, the length of the cylindrical shape in FIG. 1A (1) is the same as the height (2) and depth of the cylinder. This means the cylindrical shape (1) that excludes the hook/knob at the left (3) occupies an area that corresponds to an equilateral cube. The diameter of the hole in the middle of the cylinder that is FIG. 1A (4) is half the diameter of the cylinder. The knob sticking out the right side of the Invention as depicted in FIG. 1A (3) fits into itself and into each of the other five holes on the Invention (5, 6, 7, 8, 9). Two of those holes are easily visible in the middle of the cylinder area (4). The diameter of those holes (4) is exactly half the size of the diameter, or height, of the cylinder (2).

FIGS. 1A through N show how the knob and hook on one side of the Invention (3) fits into itself with circular quarter knob openings (10, 11, 12, 13) and hook openings (14, 15, 16, 17) and into the other five holes in the Invention with circular openings (18, 19, 20, 21) and openings for the hooks (22, 23, 24, 25).

FIG. 2A is a half cut off view of the front bottom FIG. 1A with the bottom half cut off.

FIG. 2B is a cut off view from the bottom of FIG. 1A with the bottom cut off.

FIG. 2C is another view from the back bottom of FIG. 1A with the bottom half cut off.

FIG. 2D is a view of the Invention with one half of the Invention cut off for clarity. The cutout section at the left denotes the area that is FIG. 5B.

Figure 2E:
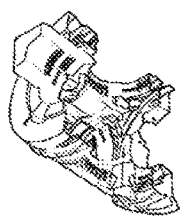
FIG. 2E is a front bottom view of FIG. 1A with the right side cut off.

FIG. 2E is a front bottom view of FIG. 1A with the right side cut off.

Figure 2F:
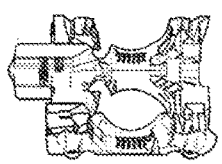
FIG. 2F is a view of FIG. 1A with a top part cut off.

FIG. 2F is a view of FIG. 1A with a top part cut off.

Figure 2G:
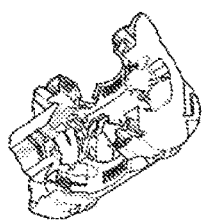
FIG. 2G is a bottom corner view of FIG. 1A with the left side FIG. 1A cut off.

FIG. 2G is a bottom corner view of FIG. 1A with the left side FIG. 1A cut off.

Figure 2H:
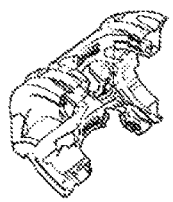
FIG. 2H is a front corner view of FIG. 1A with the right side cut off.

FIG. 2H is a front corner view of FIG. 1A with the right side cut off.

Figure 2I:
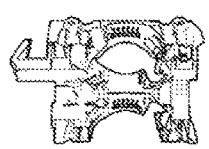
FIG. 2I is a side view of FIG. 1A with the front side cut off.

FIG. 2I is a side view of FIG. 1A with the front side cut off.

Figure 2J:
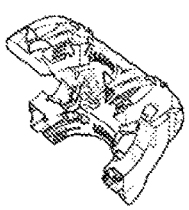
FIG. 2J is a back corner view of FIG. 1A with the left side cut off.

FIG. 2J is a back corner view of FIG. 1A with the left side cut off.

FIG. 2 is a view of the Invention with one half of the Invention cut off for clarity. Element 26 shows the insertion point for the hook at the side of the Invention that contains the knob and hook. That insertion point is found on each of the other five sides, and is denoted by element No. 29 on the right side of FIG. 2D for one of the other sides of the Invention. Element shows wavy "s" snaps that hold spheres in place when they are inserted into a construction where the Invention's hook has been inserted into another Invention shape and rotated to snap and hook in place. When the Invention has a sphere, or a cylinder, inserted into this location it is locked because the sides of the hook cannot bend inward. Those sides must bend inward to become dislodged from their lodged position when the Invention is assembled into itself. These "s" snaps at element 27 also hold cylinders in place that also lock constructions of the Invention in a manner similar to spheres by impeding the ability of the hooks to bend inward. In addition to locking constructions, cylinders can reinforce constructions. The shaft that the "s" snaps at element 27 are located in are one fourth the diameter of the diameter of the basic cylinder of the Invention. Therefore, pieces of the Invention that are one fourth the size of the Invention can be inserted into that shaft to lock or reinforce the Invention when it is assembled into a structure. The Invention can be hooked together with other Invention pieces to form a continuous cylinder that can in turn be inserted to lock or reinforce larger constructions made from the Invention.

Element 28 on FIG. 2D is the tip of the hook on the end of the knob that is itself on the top end of the Invention as shown in FIG. 2D. That hook fits into each side of the Invention and elements 26 and 29 are examples of insertion points for this hook.

Element 30 shows ribs that stick out to hold on to shafts that may be inserted into the hole to reinforce or lock the Invention in place. When the Invention is placed next to another Invention such that the two shapes meet at the edge of the Invention at FIG. 2D, element 30, then the ribs on both Inventions will be in a location that will hold a sphere between the Invention shapes. Such a sphere will lock the Invention shapes in a manner that will keep them from moving up and down, or backwards and forwards (the Invention pieces will still be able to freely move horizontally from left to right).

Element 31 shows a flexible extended stick that gets pushed to the side when the hook slides into the shaft that is labeled as element 26. There is another flexible stick on the other side of the shaft. The purpose of these shafts is to hold the hook inside and not let it slide right back out. This flexible stick works with Invention geometries that are built with flexible material. Another Invention geometry that is built with flexible material can slide into this shaft and be held in place with this flexible stick. In addition, Invention geometries that are rigid are held in place with this flexible stick when the rigid Invention geometries are inserted into a flexible geometry shape Invention.

Element 32 is a reversible "s" snap on the bottom of the hook that is also a knob at the top of the cylinder shape. This "s" snap, when it secures to itself when two Invention pieces are joined on the knob/hook side (3), snaps together when those knob/hook sides are rotated relative to each other.

Figure 3A:
FIG. 3A is a view from a front side of FIG. 1A with the front half cut off.

FIG. 3A is a view from a front side of FIG. 1A with the front half cut off.

Figure 3B:
FIG. 3B is a view from a front corner of FIG. 1A with the front cut off.

FIG. 3B is a view from a front corner of FIG. 1A with the front cut off.

Figure 3C:
FIG. 3C is a view from a bottom side of FIG. 1A with the front cut off.

FIG. 3C is a view from a bottom side of FIG. 1A with the front cut off.

Figure 3D:
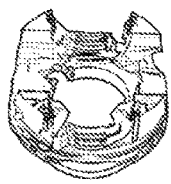
FIG. 3D is a view from a side of FIG. 1A with the front cut off.

FIG. 3D is a view from a side of FIG. 1A with the front cut off.

Figure 3E:
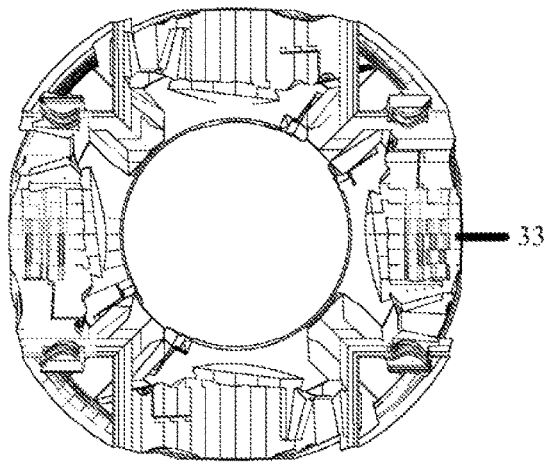
FIG. 3E is a cutout view of the bottom of the cylinder shape of the Invention.

FIG. 3E is a cutout view of the bottom of the cylinder shape of the Invention.

Figure 3F:
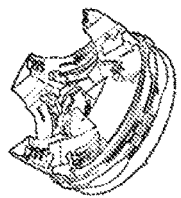
FIG. 3F is a view from the side of FIG. 1A with the front cut off.

FIG. 3F is a view from the side of FIG. 1A with the front cut off.

Figure 3G:
FIG. 3G is another view of the side of FIG. 1A with the front cut off.

FIG. 3G is another view of the side of FIG. 1A with the front cut off.

At element 33 on FIG. 3E there are "s" snaps that hold cylinders and spheres in the manner described above for the ribs in the middle of the cylindrical shape. The checkered "s" snap on the side by element 33 is a less strong "s" snap than the solid "s" snap on the other side of the Invention that can be seen in FIG. 3E.

FIG. 4 is a cutout view of the top of the cylinder shape of the Invention that has the book/knob shape.

Figure 4A:
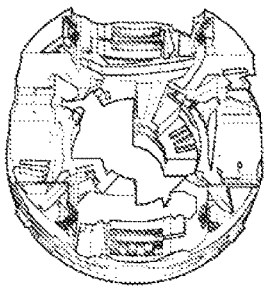
FIG. 4A is a cutout view of the top of the cylinder shape of the Invention that has the hook/knob shape.

FIG. 4A is a cutout view of the top of the cylinder shape of the Invention that has the hook/knob shape.

Figure 4B:
FIG. 4B is another view from the side of FIG. 1A with the back cut off.

FIG. 4B is another view from the side of FIG. 1A with the back cut off.

Figure 4C:
FIG. 4C is another view from the side of FIG. 1A with the side cut off.

FIG. 4C is another view from the side of FIG. 1A with the side cut off.

Figure 4D:
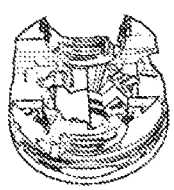
FIG. 4D is a view from a side of FIG. 1A with the front cut off.

FIG. 4D is a view from a side of FIG. 1A with the front cut off.

Figure 4E:
FIG. 4E is a view from another side of FIG. 1A with the front cut off.

FIG. 4E is a view from another side of FIG. 1A with the front cut off.

FIG. 4F is a close-up view of the top of FIG. 1A from the inside with the back side cut off.

FIG. 4G is another closer-up view of the front of FIG. 1A with the back cut off.

FIG. 5A is a wireframe view showing hook insertion points into the Invention with orange wires that correspond to one of the areas into which the hooks are inserted. Its cutout area shows one of the six places where FIG. 5B is located in the Invention. FIG. 2D shows another cutout area where the hook interface demonstrated in FIG. 5B is located. FIG. 5B is a solid view of that same area from a different vantage point for clarity. The entry point for the hook is to the right of FIG. 5B (34). The hook then swivels or rotates until it rests in place at the left side of FIG. 5B (35). The entry point on the bottom right side of the hook at FIG. 5B (34) is found in two locations on each of the six cube sides of the Invention, including on the top of FIG. 5A (36, 37), the front side (38, 39), the back side (40, 41), the bottom side (42, 43), the left side (44, 45), and the right side (46, 47). It is labeled as element 26 and element 29 on FIG. 2D.

Figure 6A:
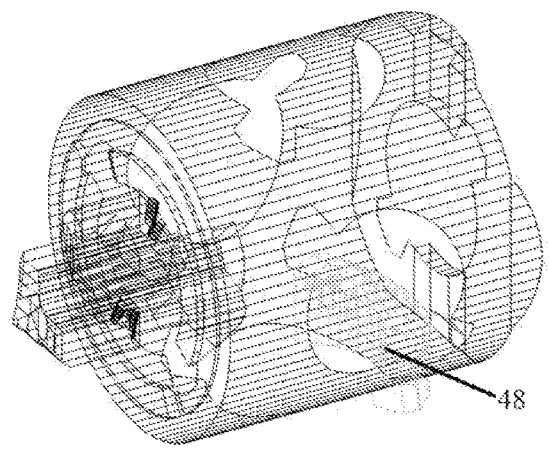
FIG. 6A is a simplified wireframe version of the Invention that shows the same hook area as that in FIG. 5A.

FIG. 6A is a simplified wireframe version of the Invention that shows the same hook area (48) as that in FIG. 5.

Figure 6B:
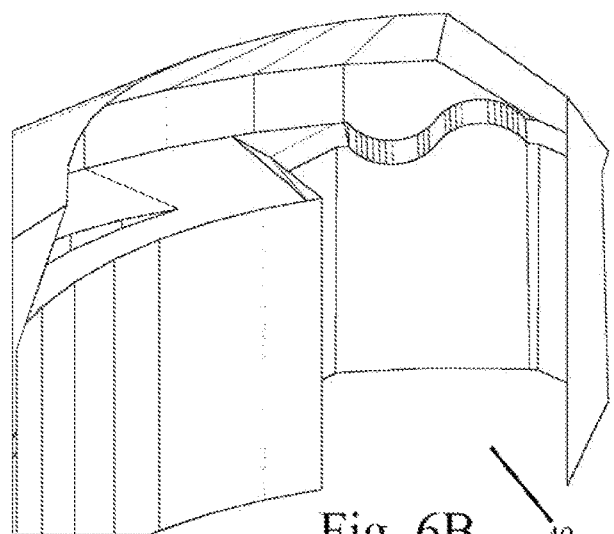
FIG. 6B shows the entry point of the hook from a view that is directly outside the hook area.

FIG. 6B shows the entry point of the hook (49) from a view that is directly outside the hook area.

Figure 6C:
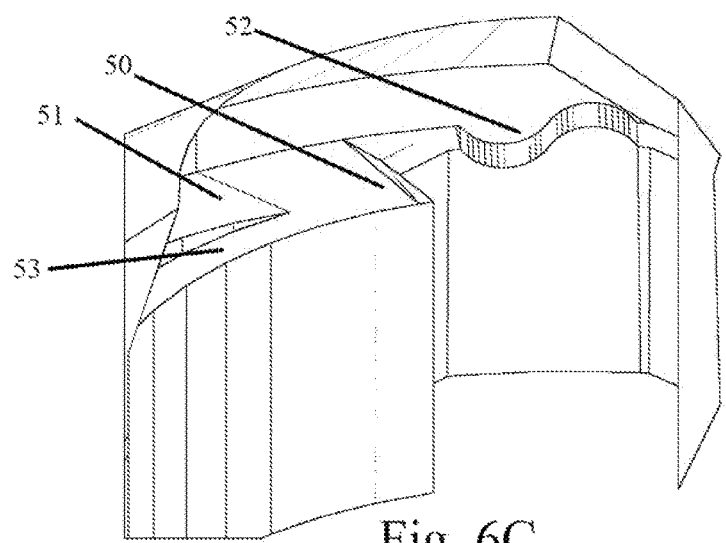
FIG. 6C shows the "s" snap element 10 inside FIG. 1A.

Element 50 on FIG. 6C denotes a sloping area that is where the hook, when inserted, rests by. To turn the hook to the left, the hook must go up the slope that is element 50. That slope therefore holds the hook in place at the location where the hook is inserted. However, if the hook is rotated with strength to the left (51), then it will push up that slope and rotate.

Element 52 at FIG. 6C is an "s" snap design that pushes out in the direction of the viewer. This causes the hook to be pushed toward the viewer when inserted into this shaft. Once inserted, it then snaps out at the location of element 52. The "s" shape is sloped down towards the viewer so that, if the hook is pulled with some pressure out, the hook will slide in, down the "s" shaped "ledge" and then down. Elements 50 and 52 are therefore features of the Invention that hold the hook in place once it is inserted. Because rigid materials cannot bend in the manner required of the hook to bend as described above, hooks on rigid material Invention do not fully extend to the edge of the enclosure denoted by element 52. Instead, the hooks of rigid material Inventions extend a distance that will allow the hook to rotate smoothly along the path that can be seen toward the left of FIG. 6C (53).

Figure 7:
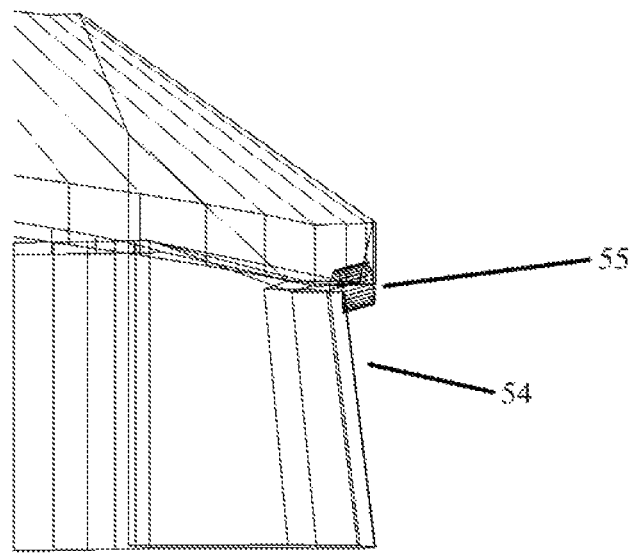
FIG. 7 shows how the "s" snap at element 10 in FIG. 6C slopes toward the center of the Invention and then slopes back up and out until it ends at the exact point of element 11.

FIG. 7 shows how the "s" snap at element 52 in FIG. 6C slopes toward the center of the Invention (54) and then slopes back up and out until it ends at the exact point of element 55.

FIG. 8 is a view of a flexible materials Invention with a focus on the female hook enclosure side where the hook locks in place. Flexible hooks that push all the way out to the side of the enclosure glide up the ramp that starts at element 56 when they are rotated to the left of FIG. 8 (58). Element 57 on FIG. 8 is the rotation path for hooks of rigid materials Inventions. They simply move to the left along a horizontal plane and then are snapped into place by the snap bump (59).

Element 58 denotes the resting place of hooks after they have been rotated.

Figure 9:
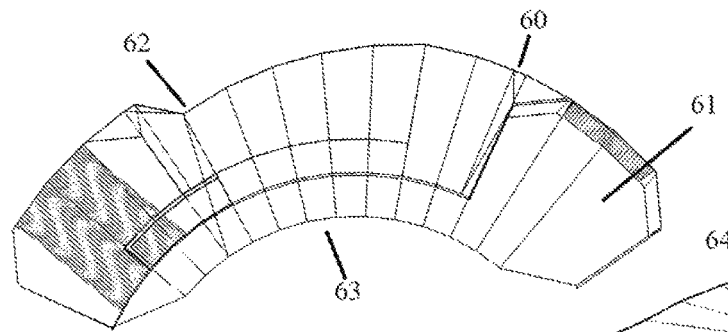
FIG. 9 at element 16 is a view from the top of the small upward slope that the hook must go up when it gets rotated into the piece. That small upward slope is how the hook is held in place at the point it is inserted into the shaft that is on the right side of FIG. 9.

FIG. 9 at element 60 is a view from the top of the small upward slope that the hook must go up when it gets rotated into the piece. That small upward slope is how the hook is held in place at the point it is inserted into the shaft that is on the right side of FIG. 9 (61).

When the inserted hook is rotated to the left of FIG. 9 the outside part of the hook enclosure pushes the hook inward gradually, towards the center of the Invention (62). This is shown in FIG. 9 by the fact that the circular line between elements 60 and 62 curves down more as it approaches element 62. That circular line from 60 to 62 is not fully circular as is the line in the bottom center part of FIG. 9 (63).

FIG. 10 shows how the Invention's hook (64) is inserted into the shaft (65) at the right side of FIG. 8. The simple view of FIG. 8 is substantially (though not exactly) reproduced in FIG. 10 (66) to show how the Invention gets inserted.

FIG. 11 shows how the invention's hooks (67, 68) interface with the enclosure that is represented by FIG. 8 (69). The view shown in FIG. 11 is how the Invention's hook protrudes when rotated (67). This is because this view was generated with software that does not ascribe any material strength to the pieces. If the part of FIG. 11 that is the shaft for the hook were a solid material, it would push the hook (which is protruding at 67) inward (in the direction of the arrow at 70) and upward (in the direction of the arrow at 71). If the Invention's hook were rotated a bit more, then it would snap out into the enclosure that is toward the right of the protruding hook in FIG. 11 (72).

FIG. 12 is a different view of the same arrangement shown in FIG. 11. Element 73 in FIG. 12 shows the point at which the Invention's hook protrudes from the enclosure into which the hook gets inserted and is rotated. The view of FIG. 12 is of the Invention's hook rotated approximately halfway between its insertion point (74) and the lock point (75).

FIG. 13 shows the Invention fully rotated into the hook enclosure (76) to the point where the hook snaps out to be securely held in that position.

FIG. 14 is a different view of the snapped-in hook (77) shown in FIG. 13.

FIG. 15A is a more detailed view of FIG. 5B. that shows the "s" snaps (78) and areas of the Invention that surround the hook functionality (79) depicted by FIG. 5B (80). Elements 81 and 82 on FIG. 15A are the flexible sticks that bend to the sides when a hook is inserted in the shaft at 83. They then hold a hook in place, which is important if a hook is on a rigid materials Invention. Inventions made with rigid materials do not have hooks that extend fully to the outer part of the hook enclosure. This is because those rigid materials hooks would break off when rotated. However, when rigid materials are inserted into a hook enclosure of a flexible materials Invention, the hooks on that invention (81, 82) hold the rigid materials hook in place. Rigid materials Inventions do not have the flexible sticks at elements 81 and 82 because those sticks are flexible. Instead, rigid materials Inventions simply have an unobstructed opening in that location (81, 82, 83). These flexible sticks are discussed above in relation to FIG. 2D, element because that is also where these flexible sticks are found.

FIG. 15B at elements 84 and 85 is a different view of the flexible sticks discussed in relation to FIG. 15A. FIG. 15C at elements 86 and 87 is a view of those sticks specifically, without the rest of the enclosure that they are a part of, for clarity.

FIG. 16 is a profile view of the hooks (88, 89) that demonstrates the two directions the Invention's hooks move when they are inserted into the hook enclosure and rotated in the manner demonstrated by FIG. 5B. Its cutout from the Invention is shown in FIG. 1K. When the hooks are rotated the outside of hooks on flexible Inventions is pushed up in the direction of the number 90 for element 90. When the hook is inserted into the hook shaft it is pushed toward the center of the Invention, which is in the direction away from the number "91" at element 91. The hook is also pushed in those directions when it is rotated in the hook shaft described above, including at FIG. 5B.

FIG. 17 is a cutout of the Invention as shown in FIG. 1K. FIG. 17 at element 92 shows where the bottom of the Invention interfaces with the raised part of the top part of the Invention at element 94 in FIG. 18. FIG. 18 is a view from higher up and to an angle of the cutout of the Invention that is FIG. 16. The bottom part of the Invention at FIG. 17 element 93 rests on the top part of the Invention at element 95 on FIG. 18 when the hooks on the top of the Invention (96, 97) are inserted into the bottom part of another Invention piece (98). The raised part of the top of the Invention at element 94 on FIG. 18 fits into the recessed place to the left of element 95 on FIG. 18 when the hook side of the Invention is hooked into the hooked side of another Invention.

FIG. 19B is another view of the cutout of the Invention that is FIG. 16. FIG. 19A is a cutout of the view from the bottom of FIG. 19B. FIG. 19A at element 99 and FIG. 19B at element 100 are different views of the "s" snap that is also shown at FIG. 2D element 27 and that is discussed above. These "s" snaps hold spheres that lock Invention pieces when they are hooked together, for example. The "s" snaps also hold cylinders.

FIG. 20A is a profile view of the Invention from the top showing the hooks (101, 102) and the hook shafts (103, 104) on side of the invention with the hook/knobs (3). The eight small protrusions around the edges (105, 106, 107, 108, 109, 110, 111, 112) are bulges that snap, or help grab, the Invention when it is inserted into cylinders or when it is inserted into another Invention that is twice the size of this Invention.

FIG. 20B is a profile view of the Invention from the opposite side of the view of FIG. 20A.

FIGS. 21 and 22 are different views of the Invention for clarity. The outside of the Invention has circular grooves running around the Invention on the left (113) and right side (114) of the cylinder at FIG. 22. The indentations allow for protrusions in other pieces to protrude into those indentations and hold the Invention more securely. The protruding parts in those grooved circular areas (115, 116) allow the Invention to grab onto other pieces. This is helpful when a flexible materials Invention is inserted into a rigid materials Invention that does not have protruding parts. In such a circumstance, the flexible materials piece will grab onto the rigid materials piece that only has indentations in the corresponding circular areas.

FIG. 23 is variation of the Invention in a pole format (117) that allows it to more easily pull together larger constructions. It also allows for the Invention to reinforce structures when it is in this FIG. 23 configuration. The side of the FIG. 23A Invention shows hook insertion points (118, 119, 120) for Invention pieces that are half the size of the Invention shown and that are also one fourth the size of the Invention shown. The Invention shown in FIG. 23A fits into itself on the ends (121, 122). In other words, the ends fit into themselves when the Invention pieces are of the same size.

FIG. 24 is the Invention in a format that allows the insertion of circular magnets (123, 124, 125, 126). The surfaces of FIG. 24 can be magnetized to attract such magnets and the circular magnets so affixed can then help strengthen constructions with the Invention. All protruding parts of the Invention can be magnetized with positive charges while the receding parts can be magnetized with negative charges to increase the grip of the Invention when inserted into itself.

FIG. 25 is a simplified view of the Invention to show how its hooks work. The viewer can see the hooks (127, 128, 129) and the hook insertion points (130, 131, 132, 133).

FIG. 26 is a version of the Invention that allows for poles in the shape of the Invention to be inserted through it (134, 135, 136). Such poles can be combinations of Invention pieces that are simply standard cylinders that occupy the space of a cube (1, 2) or they can be stretched cylinders like the one in FIG. 23.

FIG. 27 shows the Invention in a configuration where cubes can be inserted on its corners (137, 138 139, 140), in addition to having poles traverse the invention (141, 142, 143, 144).

FIGS. 28 through 36 show how Inventions of the same size, and of different sizes, can be assembled into constructions to have a progressively larger construction.

FIG. 28 is an embodiment of the Invention in a cylinder that occupies an equilateral cube space because the length of its cylinder (145) is the same as its width (146).

FIG. 29 shows how an Invention that is half the size of another Invention (147) can be inserted into the invention (148). FIG. 29 has the same view as FIG. 28 except that an Invention one half the size of FIG. 28 (147) has been inserted into an Invention that is the size of FIG. 28 (148).

FIG. 30 is another view of FIG. 29 at an angle that shows how the smaller invention (149) protrudes from the larger invention (150).

FIG. 31 shows how an Invention of the same size as another Invention (151) can be inserted into a construction (152) that already has an Invention that is half its size (153).

FIG. 32 shows how the construction that is FIG. 31 (154) can have an additional Invention inserted (155) to build out the construction more.

FIG. 33A shows Invention pieces assembled when they are of equal size (156, 157), half the size of another piece (158) and a piece that is one-fourth the size of the larger pieces (159).

FIG. 33B is the construction at FIG. 33A but viewed at an different angle to reveal the three larger Invention pieces (160, 161, 162), the Invention piece that is half the size of the larger pieces (163) and the Invention piece that is one fourth the size of the larger Invention pieces (164).

FIG. 34A is the same construction as FIG. 33 except that additional Invention pieces have been added at the top left (165) and at the middle left (166). The piece added at the middle left (166) is one fourth the size of the large pieces in FIG. 34.

FIG. 34B is the same construction as FIG. 34A except from a profile view.

FIG. 35 is the same construction as FIG. 34 except on the right is also has a piece that is twice the size (167) of the three other large pieces in the construction.

The pieces can be magnetized and roll around with changes in their magnetic composition through an outside Bluetooth or wireless process. This requires no moving parts, except for the pieces themselves that move on surfaces and through constructions built by Invention pieces or other constructions. The Invention pieces' movements are powered by changes in their magnetic surface that are controlled remotely or internally with a computing device on the pieces. Humans can remotely control these pieces, or they can be controlled with artificial intelligence. In addition to rolling around, the pieces can rotate themselves magnetically and thereby snap, or hammer, themselves into place.

The invention claimed is:

1. A block system comprising:
   cylindrical blocks capable of being assembled to form modular structures including tables, chairs, stools, walls and beams, each cylindrical block comprising:
   a length that is the same as the diameter of the cylinder;
   a hollow circular knob with a diameter half that of the cylinder's diameter protruding from one of the circular sides of the cylindrical block, wherein a hollow center of the knob has a diameter that is one-fourth the diameter of the cylindrical block, wherein the knob has hooks protruding radially from the center of the knob to opposite sides of the end of the knob;
   receding cavities on each of the ends of the cylindrical block into which the knob of another cylindrical block can be inserted and rotated so the hooks on the knob of the cylindrical block insert into the cavities of another cylindrical block and rotate to hold the two cylindrical blocks together
   four holes on the cylindrical block curved side that are equally distant from each other and that are curved side receding cavities into which the knob of the another cylinder inserts and rotates to hold the two cylindrical blocks together, wherein the area of the curved side receding cavities that an outer part of the hook touches as it rotates when the knob is inserted into the curved side receding cavity gradually pushes the hook towards the center of the knob it is on as the knob is rotated in the cavity until the knob snaps back out when it is fully rotated inside the cavity so it is held in place in the location where it is fully rotated into;
   wherein the area of the curved side receding cavities that an underside of the hook touches as it rotates when the knob is inserted into the receding cavity gradually pushes an outside of the hook away from its cylindrical block as the hook is rotated in the cavity until the hook snaps back toward the cylinder the hook is affixed to when the hook is fully rotated inside the cavity so it is held in place in the location where it is fully rotated into;
   wherein the area of the curved side receding cavities that the underside of the hook touches as it rotates has a receding area that allows for a rigid hook on a cylindrical block to rotate in the receding cavity without snapping either away from the cylindrical block or towards the center of the cylindrical block;
   wherein the hooks and receding cavities have a small enough size so that six cylinders can be inserted into each of the receding cavities of another cylinder and rotate to hook themselves onto the cylinder without any of the knobs bumping into another knob inside the cylindrical block into which they are hooked;
   wherein the underside of the hooks has an undulating surface with a protruding and a receding area that corresponds to protruding and receding areas in the receding cavities so that when a knob is inserted into a receding area and is turned, the protruding and receding areas on the undersides of the hook will match with protruding and receding areas in the receding cavities to allow the hook to snap into place and remain in its hooked position;
   protruding and receding undulations that go in a circle around two ends of the curved side of the cylindrical block so that, when the cylinder is inserted into the receding cavities on the curved sides of another that is twice the size of the inserting cylinder, the larger cylinders curved side receding cavities will have protruding and receding undulations that mirror a smaller cylinder's protruding and receding undulations so the smaller cylinder will snap into place and be held in place in the larger cylinder's receding cavities;
   wherein a receding cavity on a side of the cylindrical block opposite a side with a protruding knob has a receding cavity that allows for the protruding knob to be inserted and to be rotated around indefinitely without being snapped into any one fixed position;
   wherein a hollow inside surface of the protruding knob has protruding and receding undulations that go in a circle along a hollow inside surface so that a cylindrical block that is one fourth the size of another cylindrical block can be inserted into the hollow inside surface and be held in place by fitting its protruding and receding undulations that go in a circle around the two ends of the curved side of the cylinder.

* * * * *